United States Patent [19]

Starnes

[11] Patent Number: 4,848,832
[45] Date of Patent: Jul. 18, 1989

[54] SLIDING DOOR AND WINDOW ASSEMBLY FOR PICKUP TRUCK WITH CAP

[76] Inventor: Doris H. Starnes, 1476 Danbury Dr., Norcross, Ga. 30093

[21] Appl. No.: 104,222

[22] Filed: Oct. 5, 1987

[51] Int. Cl.⁴ .............................................. B60P 3/32
[52] U.S. Cl. .................................... 296/166; 296/155; 296/190
[58] Field of Search ............... 296/166, 190, 155, 146; 49/163

[56] References Cited

U.S. PATENT DOCUMENTS

| | | | |
|---|---|---|---|
| 3,420,566 | 1/1969 | Obra | 296/166 |
| 4,093,301 | 6/1978 | Kwok | 296/166 |
| 4,124,054 | 11/1978 | Spretnjak | 296/166 |
| 4,458,939 | 7/1984 | Höhn | 296/166 |

*Primary Examiner*—Robert R. Song
*Attorney, Agent, or Firm*—Hurt, Richardson, Garner, Todd & Cadenhead

[57] ABSTRACT

A sliding door and window assembly for pickup trucks having caps over the bed portion is disclosed, the invention providing sliding doors and windows in the rear wall of the cab, doors in the front wall of the bed, and windows in the front wall of the cap. Upper and lower seals are provided to seal the space between the cab and bed portions, thus providing access between the cab and bed while sealing the interior from foreign contaminants.

6 Claims, 1 Drawing Sheet

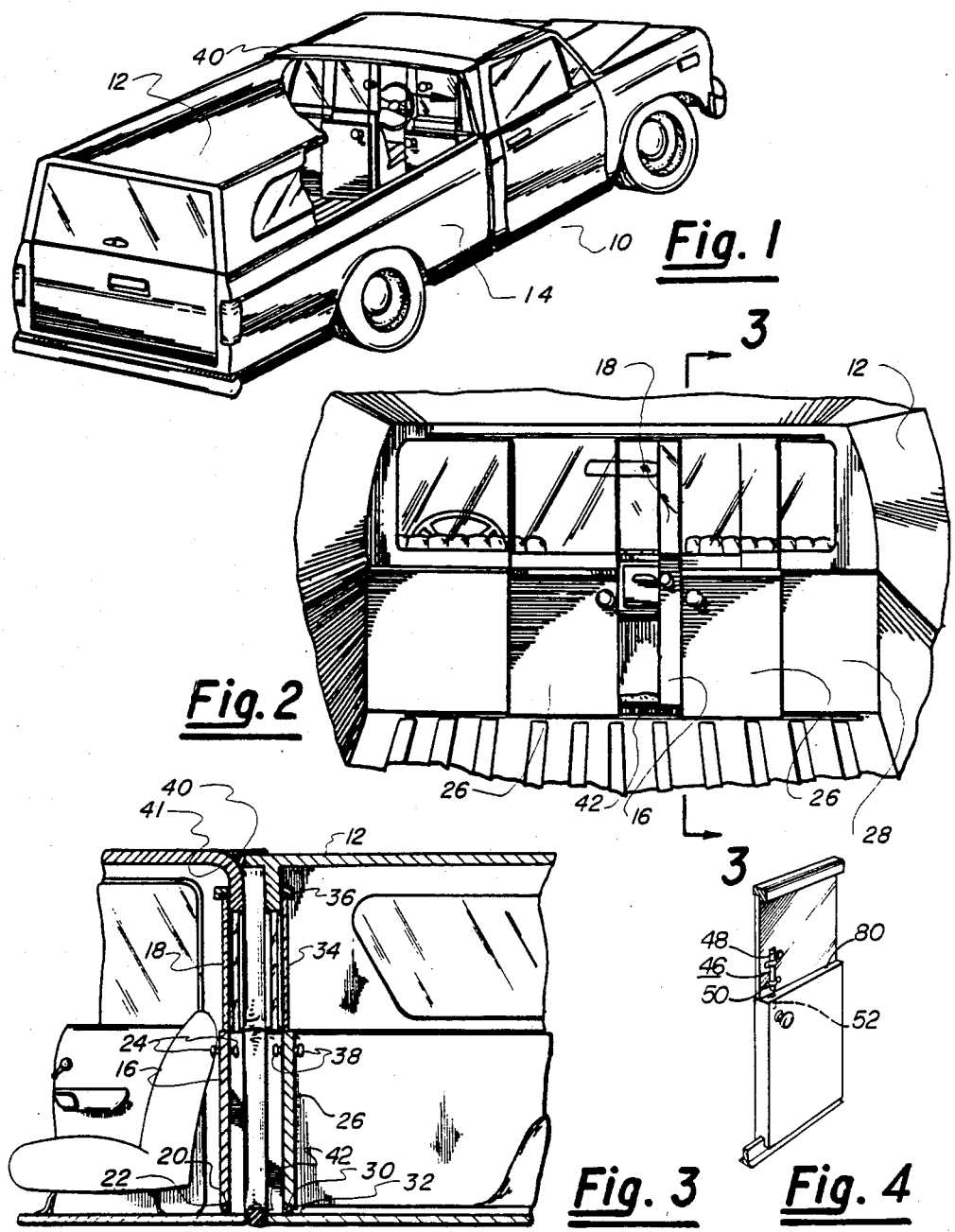

SLIDING DOOR AND WINDOW ASSEMBLY FOR PICKUP TRUCK WITH CAP

BACKGROUND OF THE INVENTION

Many pickup trucks are designed with a sliding glass window located behind the heads of the driver and passengers. The windows are normally disposed in tracks and have right and left side portions which slide laterally, thereby providing an opening in the center portion of the window. The window is located over the rear wall of the cab which is, in turn, spaced slightly forward of the front wall of the truck bed.

Many trucks of this type are designed to receive a cap which covers the bed. The cap is basically a shell with a front wall portion and an open bottom portion, the lower edges of which engage and are secured to the upper edges of the truck bed. The front wall portion may be provided with windows opposite the windows in the cab. The bed can thus be used for transporting materials, equipment, and in some cases, people, while protecting what is being transported from the elements.

One example of this type of arrangement is found in U.S. Pat. No. 4,093,301 to Kwok for a Movable Door for a Vehicle. The invention shows a truck body having a sliding door and window in the rear of the cab which is aligned with a sliding door in the camper portion. The combination permits access to the camper from the cab of the truck. This type of camper, however, normally is self-contained with a front wall and a floor, and is designed as an essentially complete enclosure.

SUMMARY OF THE INVENTION

It is, therefore, one of the principal objects of the present invention to provide a sliding door and window assembly for a pickup truck and a cap in which the truck cab has windows and doors, the cap includes front windows, and the front wall of the bed includes doors, for allowing movement of people, materials, and heated or cooled air therebetween.

Another object of the present invention is to provide a sliding door and window assembly that can be easily operated from the truck cab or from the bed of the truck and which is durable to provide a long service life.

A further object of the present invention is to provide a sliding door and window assembly for the truck bed cap which does not interfere with the mounting of the cap on the bed and which includes upper and lower sealing means.

These and other objects are attained by the present invention which relates to a sliding door and window assembly for a pickup truck having a cap mounted on the bed thereof. The invention includes sliding doors and windows in the cab of the truck, a window assembly which essentially forms the front wall portion of the cap, and door means in the front wall of the bed. Means are provided for sealing the connection against water, wind, and other contaminants and the invention may be adapted for most pickup trucks and caps in the same general class.

Various additional objects and advantages will become apparent from the following description, with reference to the accompanying drawings.

BRIEF DESCRIPTION OF THE DRAWINGS

FIG. 1 is a perspective view of a pickup truck and cap, with a portion of the cap broken away showing the present sliding door and window assembly in installed position;

FIG. 2 is a partial end elevational view of the present invention, showing the right side open and the left side closed;

FIG. 3 is a cross-sectional view showing the interface between the truck bed and cap and the truck cab, the view being taken on line 3—3 of FIG. 2; and FIG. 4 is a partial perspective view of the door and window assembly of the present invention, illustrating the relative securing means.

DETAILED DESCRIPTION OF THE PREFERRED EMBODIMENT

Referring now more specifically to the drawings, and to FIG. 1 in particular, numeral 10 designates generally the pickup truck while numeral 12 designates generally the cap which fits over the bed 14 of the truck. The truck and cap illustrated are typical of such designs, with the roof line of the cap and the roof line of the truck cab being generally in the same plane. The present invention is, in general, designed for vehicles such as that illustrated in FIG. 1, that is, for pickup trucks having a cap which lies generally in the same plane as the roof of the truck cab.

In the present invention, the truck cab is modified to include a set of laterally sliding cab doors 16 in the rear wall thereof, located below laterally sliding windows 18 which may be present or can be installed in place of a fixed pane of glass. These cab doors are disposed on a track 20, over which the doors are disposed, engagement with the door being provided through a generally central groove 22 formed in the bottom of the door. The cab doors are operable from either side and are provided with handles 24, one on each side. Latch or lock means (not shown) may also be provided for securing the doors in either open or closed position. In addition, the doors 16 and windows 18 are operable either separately or as units, thus providing flexibility in operation.

The bed of the truck is modified, as shown in FIGS. 2 and 3, to include laterally slidable bed doors 26 in the front wall 28 of the bed. These doors 26 are also mounted on a track 30, the track engaging groove 32 in the bottom edge of the doors. Disposed above the doors in the bed are a second set of laterally slidable windows 34 which extend from the top edge of the doors to a suitable upper retaining means such as bracket 36. The cap 12 of the vehicle may thus be sealed off from the cab of the truck as desired. The bed doors are also equipped with handles 38, on each side thereof, and latch and/or lock mean (not shown) may be provided to secure the doors and windows in the bed in open or closed position.

As above mentioned, cab doors 16 and bed doors 26 and their corresponding windows 18 and 34 respectively are slidable either independently or in conjunction with each other. FIG. 4 shows in detail one method for accomplishing a separable union between the window and the door. In FIG. 4 a latch 46 consisting of a sliding rod 48 contained within a clasping means 50 is attached to the window 18 or 34. The windows 18 or 34 are disposed on top of the corresponding sliding doors 16 or 26 are supported in any suitable manner, such as within a groove (not shown) extending lengthwise along the top of the door for receiving the window or by simply resting on the upper surface 80 of the door which can be composed of a plastic material to facilitate lateral sliding movement thereon. The window 18 or 34 is supported on top by a bracket 36 which receives the window's top edge within any type of roller or groove assembly which can retain and support the window from the top, such that lateral motion of the window is possible.

The window 18 or 34 rests on the door 16 or 26 which has disposed therein a receiving means 52 to retain the sliding rod therein The sliding rod 48 may be mated with the receiving means only when the window and door are matched such that they are in a vertically aligned position. Thus, when the rod 48 and receiving means 52 are mated, the window and door act in unison. When the rod is withdrawn the window and door can be operated independently, each door being supported by the track below and each window supported by the bracket above.

The space between the cab and the bed is sealed from the ingress of moisture, dust, or other contaminants by an upper sealing means 40 and a lower sealing means 42. The upper sealing means may be of a number of suitable types, a preferred embodiment being shown as a generally inverted, 3" to 4" U-shaped flange or lip which is attached with hooks, screws or the like or molded to the cab for semi-permanently sealing the forward end to the top and sides of the truck cab. As shown in FIG. 1, the cap has elongated top and side walls, a modification from conventional caps. The rear end of the flange extends over and is sealed in conventional manner to the roof of the cap 12. The cap is slid beneath the lip during installation, as shown in FIGS. 1 and 3, the sealing being accomplished by a gasket 41 which extends around the inner edge of the lip 40 where the lip on its underside meets the cab and contacts the truck cab. The gasket 41 is also located where the edge of the cap meets the cab and is made of a flexible material for sealing. The lip 40 combined with the gasket 41 prevents the ingress of foreign material into the bed or cab portions.

The lower sealing means is any flexible material which extends between the points of joinder between the cab and the bed such that the seal is attached to both the cab and the bed and eliminates any existing gap between the bed and the cab. The lower sealing means 42 can be also a generally U-shaped or well-shaped member having a floor portion, upwardly extending wall portions adjacent thereto, and laterally extending flange portions (not shown) which are engaged to the cab on the front side using hooks or a similar means and a portion of the upper rim of the bed on the rear side, as shown in FIG. 3. The flanges are held in place in any suitable conventional manner, such as with sleeves for receiving the flanges, hooks, or with screws or the like. The central portion serves as a sealant means and is also stiffened to provide the auxiliary floor portion required between the cab and the bed. Thus, the floor portion seals the bottom of the assembly, the side portions seal the side area from the floor portion upwardly to the level of the truck bed, and the laterally extending portions seal the interface between the cap and the bed.

Thus, with this arrangement, the truck cab can be opened to the bed portion providing access to all parts of the vehicle not only for the riders, but for heat, air conditioning, fresh air venting and music or conversation. In the use and operation of the present invention, the doors and windows are meant to be representative, in that for example, a single door may be provided instead of the double doors shown. All of the doors and windows are operable independently of each other, thus providing a versatile and practical modification for existing vehicles as well as new vehicles.

While an embodiment of a sliding door and window assembly for pickup trucks with caps has been shown and described in detail herein, various changes and modifications may be made without departing from the scope of the present invention.

I claim:

1. A sliding door and window assembly for a pickup truck having a cap over the bed portion of the truck, for providing access to the bed portion through the rear wall of the cab portion, said assembly comprising first door means disposed in said rear wall of the cab with first window means disposed thereabove, corresponding second door means disposed in the front wall of said bed portion and having second window means disposed thereabove and corresponding to said first window means, track means disposed on the floor of said cab and bed portions for receiving said first and second door means, said first and second door means being laterally slidable in said track means, an upper sealing means secured at its front edge to the cab and having a rear edge which extends over the cap, and a lower sealing means secured to the cab and to the bed for preventing ingress of foreign contaminants.

2. A sliding door and window assembly as defined in claim 1 in which said first and second door and window means are selectively and independently operable, and include handle means to effect such operation.

3. A sliding door and window assembly for a pickup truck having a cap over the bed portion thereof, for providing access between the cab of the truck and the bed of the truck through the rear wall of the cab and the front wall of the bed, wherein the improvement comprises,
   a first door means disposed in and forming a portion of said rear wall of said cab, said door means being laterally slidable therein;
   a first window means disposed above first door means and being selectively connected thereto, said first window means forming a portion of said rear wall and also being laterally slidable therein;
   a second door means disposed in and forming a portion of said front wall of said bed and being laterally slidable therein;
   a second window means disposed above said second door means and being selectively connected thereto, said second window means forming a portion of the front wall of said cap and also being laterally slidable therein; and
   upper and lower sealing means for sealing the space between said cab and bed and preventing ingress of contaminants to the cab and bed.

4. A sliding door and window assembly as defined in claim 3 in which said upper sealing means includes a lip releasably secured at its forward edge to the roof of the cab and extending rearwardly therefrom to cover the forward edge of the roof of the cap.

5. A sliding door and window assembly as defined in claim 3 in which said lower sealing means includes a generally U-shaped member having a floor portion, side wall portions extending upwardly therefrom on each side and laterally extending flange portions extending therefrom on each side, and including means for engaging the cab and the bed and preventing ingress of contaminants.

6. A sliding door and window assembly is defined in claim 3 in which said assembly includes track means in the floor of said cab and said bed for receiving said first and second door means, respectively.

* * * * *